(12) United States Patent
Kim et al.

(10) Patent No.: US 8,889,310 B2
(45) Date of Patent: Nov. 18, 2014

(54) FUEL CELL SYSTEM AND DRIVING METHOD FOR THE SAME

(75) Inventors: Hyun Kim, Yongin-si (KR); Dong-Rak Kim, Yongin-si (KR); Dong-Hyun Kim, Yongin-si (KR); Ming-Zi Hong, Yongin-si (KR); Woong-Ho Cho, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 728 days.

(21) Appl. No.: 12/983,503

(22) Filed: Jan. 3, 2011

(65) Prior Publication Data

US 2011/0318664 A1  Dec. 29, 2011

(30) Foreign Application Priority Data

Jun. 29, 2010  (KR) .................. 10-2010-0062272

(51) Int. Cl.
*H01M 8/04* (2006.01)
(52) U.S. Cl.
CPC ............ *H01M 8/04753* (2013.01); *Y02E 60/50* (2013.01)
USPC ........................................................ 429/444
(58) Field of Classification Search
USPC ........................................................ 429/444
See application file for complete search history.

(56) References Cited

U.S. PATENT DOCUMENTS

| 2005/0129990 A1* | 6/2005 | Ozeki et al. ............... 429/12 |
| 2006/0251937 A1* | 11/2006 | Inai et al. ................ 429/23 |
| 2010/0261078 A1* | 10/2010 | Bono ...................... 429/429 |

FOREIGN PATENT DOCUMENTS

| JP | 2005-063903 A | 3/2005 |
| JP | 2007-299647 | 11/2007 |
| KR | 1020090043372 A | 10/2007 |
| KR | 10-2008-0044429 A | 5/2008 |
| KR | 1020080077822 A | 8/2008 |
| KR | 1020090036014 A | 4/2009 |

OTHER PUBLICATIONS

KIPO Notice of Allowance (Korean only) issued Aug. 9, 2012 in KR 10-2010-0062272, which is the priority application to the present application.

* cited by examiner

*Primary Examiner* — Karie O'Neill Apicella
(74) *Attorney, Agent, or Firm* — Knobbe, Martens, Olson & Bear LLP

(57) ABSTRACT

A fuel cell system including a fuel cell stack having a plurality of unit cells is provided. A method of driving the fuel cell stack is also provided. The method may include supplying a fuel to a fuel cell stack, supplying an oxidizer to the fuel cell stack, controlling supply of the fuel and the oxidizer to operate the fuel cell stack, calculating a total operation time of the fuel cell, and/or varying a stack activation period in which the oxidizer is blocked to the fuel cell stack according to the total operation time and a stack activation cycle of which the stack activation period is generated.

16 Claims, 3 Drawing Sheets

FUEL CELL SYSTEM AND DRIVING METHOD FOR THE SAME

CROSS-REFERENCE TO RELATED APPLICATIONS

This application claims priority to and the benefit of Korean Patent Application No. 10-2010-0062272 filed in the Korean Intellectual Property Office on Jun. 29, 2010, the entire contents of which are incorporated herein by reference.

BACKGROUND

1. Field of the Disclosure

The described technology relates to a fuel cell system and a driving method thereof. More particularly, it relates to a fuel cell system and a driving method to prevent deterioration of a fuel cell stack and thus extend the life-span of the fuel cell stack.

2. Description of the Related Technology

A fuel cell is a device that electrochemically generates electrical power by using a fuel (hydrogen or reformed gas) and an oxidizer (oxygen or air). That is, the fuel cell generates electrical energy by using an electrochemical reaction between the fuel (hydrogen or reformed gas) and the oxidizer (oxygen or air). Pure oxygen or air containing a large amount of oxygen is used as the oxidizer of the fuel cell, and pure hydrogen or a fuel containing a large amount of hydrogen that is generated by reforming a hydrocarbon-based fuel such as liquefied natural gas (LNG), liquefied petroleum gas (LPG), and methanol (CH3OH) is used as the fuel.

Using the fuel cell causes deterioration. The degree of deterioration may be changed according to the operation conditions of the fuel cell. That is, although the total operation time of the fuel cell may be the same, the particular operating conditions may be altered to prevent deterioration.

SUMMARY OF CERTAIN INVENTIVE ASPECTS

In one aspect, a fuel cell system and a driving method thereof are provided, which improve the life-span of the fuel cell according to the operation conditions of the fuel cell.

In another aspect, a fuel cell system includes, for example, a fuel cell stack having a plurality of unit cells, a fuel supply unit configured to supply fuel to the fuel cell stack, an oxidizer supply unit configured to supply oxidizer to the fuel cell stack and a controller electrically connected to both the fuel supply unit and the oxidizer supply unit.

In some embodiments, the controller is configured to control operation of the fuel supply unit and the oxidizer supply unit, calculate a total operation time of the fuel cell stack operated by the fuel and oxidizer, and vary a stack activation period blocking the oxidizer to the fuel cell stack according to the total operation time and a stack activation cycle of which the stack activation period is generated.

In some embodiments, the controller is configured to increase the stack activation period, decrease the stack activation cycle, and increase the reference time if the total operation time reaches a predetermined reference time. In some embodiments, the controller is configured to increase the stack activation period by the predetermined unit period each time the total operation time reaches a reference time. In some embodiments, the unit period is uniform. In some embodiments, the unit period is increased according to the total operation time. In some embodiments, the controller is configured to decrease the stack activation cycle by a predetermined unit cycle period each time the total operation time reaches the reference time. In some embodiments, the unit cycle period is uniform. In some embodiments, the unit cycle period is increased according to the total operation time. In some embodiments, the controller increases the reference time by the unit reference period to generate a reference time every time the total operation time reaches the reference time. In some embodiments, the unit reference period is uniform. In some embodiments, the unit reference period is decreased according to the total operation time.

In another aspect, a method of driving a fuel cell system, includes, for example, supplying a fuel to a fuel cell system having a fuel cell stack, supplying an oxidizer to the fuel cell stack, controlling the supplying of the fuel and the supplying of the oxidizer to operate the fuel cell stack, calculating a total operation time of the fuel cell system, and varying a fuel cell stack activation period in which the oxidizer is blocked to the fuel cell stack using the total operation time and a fuel cell stack activation cycle and a fuel cell stack activation period.

In some embodiments, the fuel cell stack includes, for example, a plurality of unit cells. In some embodiments, the varying of the fuel cell stack activation period includes, for example, increasing the fuel cell stack activation period, decreasing the fuel cell stack activation cycle, and increasing a reference time if the total operation time reaches the reference time. In some embodiments, the varying a fuel cell stack activation period includes, for example, increasing the fuel cell stack activation period by a predetermined unit period when the total operation time reaches the reference time. In some embodiments, the fuel cell stack activation cycle is decreased by a predetermined unit cycle period when the total operation time reaches the reference time. In some embodiments, the reference time is increased by the unit reference period to generate a reference time when the total operation time reaches the reference time.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
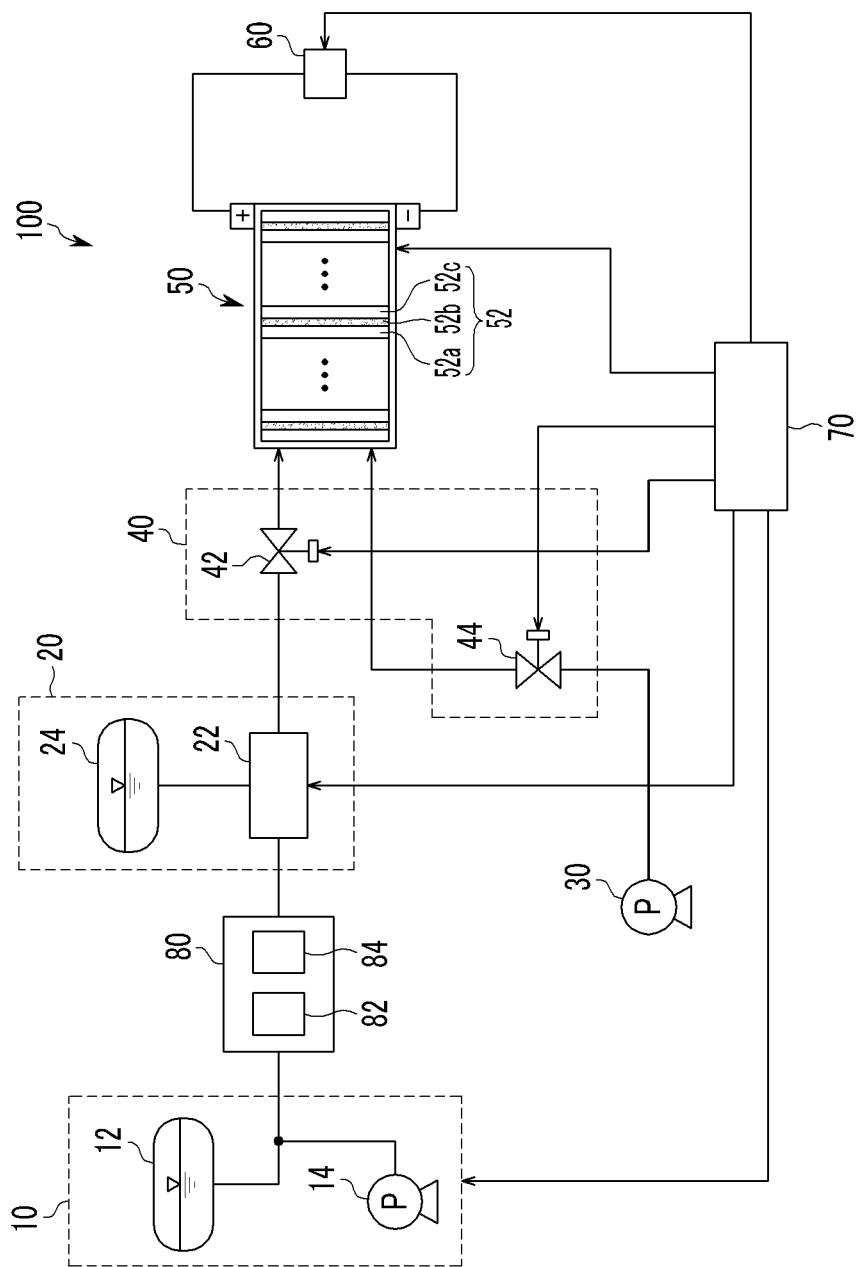
FIG. 1 is a block diagram depicting a configuration of a fuel cell system according to an exemplary embodiment of the present disclosure.

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Similarly, when it is described that an element is "coupled" to another element, the another element may be "directly coupled" to the other element or "electrically coupled" to the other element through a third element. Parts not related to the description are omitted for clarity. Hereinafter, like reference numerals refer to like elements. Certain embodiments will be described in more detail with reference to the accompanying drawings, so that a person having ordinary skill in the art can readily make and use aspects of the present disclosure.

FIG. 1 is a schematic block diagram of a configuration of a fuel cell system according to an exemplary embodiment. Referring to FIG. 1, a fuel cell system 100 in operation may employ a polymer electrolyte membrane fuel cell (PEMFC) method in which hydrogen is generated by reforming a fuel to thereby generate electrical energy through an electrochemical reaction between oxygen and the hydrogen. However, the present disclosure is not limited thereto, and the fuel cell system may include, for example, a hydrogen-containing liquid or a gas fuel such as methanol, ethanol, LPG, LNG, gasoline, and butane gas. In this case, a fuel cell stack 50 may be formed through a direct oxidation fuel cell method in which electrical energy is generated through direct reaction between liquid or gas fuel with oxygen in a unit cell.

In operation, the fuel used for the fuel cell system 100 may be a liquid or gaseous carbon-hydrogen fuel, for example methanol, ethanol, natural gas, and LPG. In addition, the fuel cell system 100 may use oxygen gas stored in a storage unit or air as an oxidizer that reacts with hydrogen.

The fuel cell system 100 includes a fuel supply unit 10, a humidifying unit 20, an oxidizer supply unit 30, a supply amount controller 40, a fuel cell stack 50, a load 60, and a controller 70. The fuel supply unit 10 is configured to supply fuel to the fuel cell stack 50. The fuel supply unit 10 includes a fuel tank 12 and a fuel pump 14. The fuel tank 12 is configured to store liquid fuel. The fuel pump 14 is in fluid communication with the fuel tank 12. The fuel pump 14 is configured to emit the liquid fuel stored in the fuel tank 12 by using a predetermined pumping force from the fuel tank 12.

The humidifying unit 20 includes a humidifier 22 and a water supply unit 24. The humidifier 22 is in fluid communication with the fuel tank 12, and is configured to humidify the liquid fuel emitted from the fuel tank 12. The amount of humidification from the humidifier 22 is controlled by the controller 70. The water supply unit 24 is in fluid communication with the humidifier 22 and is configured to supply water to the humidifier 22.

The oxidizer supply unit 30 is configured to supply an oxidizer to the fuel cell stack 50. The oxidizer supply unit 30 includes an oxidizer pump. The oxidizer pump is configured to aspirate external air with a predetermined pumping force.

The supply amount controller 40 includes a fuel control valve 42 and an oxidizer control valve 44. The fuel control valve 42 is installed between and is in fluid communication with both the humidifying unit 20 and the fuel cell stack 50. The fuel control valve 42 is configured to supply the humidified fuel to the fuel cell stack 50. The degree to which the fuel control valve 42 is opened is electrically controlled by the controller 70. Thus, in combination, the fuel control valve 42 and the controller 70 are configured to supply a particular amount of the humidified fuel. The oxidizer control valve 44 is installed between and is in fluid communication with the oxidizer supply unit 30 and the fuel cell stack 50. The oxidizer control valve 41 is configured to supply the oxidizer to the fuel cell stack 50. The degree to which the oxidizer control valve 44 is opened is electrically controlled by the controller 70. Thus, in combination, the oxidizer control valve 44 and the controller 70 are configured to supply a particular amount of the oxidizer.

The fuel cell stack 50 includes a plurality of unit cells configured to generate electrical energy by inducing an oxidation/reduction reaction between the fuel and the oxidizer. As one of the plurality of unit cells, a unit cell 52 includes a membrane electrode assembly (MEA) 52b configured to oxidizes/reduces oxygen among the fuel and the oxidizer, and separators (also referred to as bipolar plates) 52a and 52c configured to supply the fuel and the oxidizer to the MEA 52b. The unit cell 52 has a structure in which the separators 52a and 52c are positioned with the MEA 52b interposed therebetween.

The MEA 52b includes a membrane disposed at the center thereof, a cathode disposed at a first side of the membrane, and an anode disposed at a second side of the membrane. In operation, the cathode is supplied with the oxidizer and the anode is supplied with the fuel through the separators 52a and 52c. The fuel cell system 100 forms the fuel cell stack 50 by arranging unit cells 52 in series.

The load 60 is electrically connected to a positive (+) terminal and a negative (−) terminal of the fuel cell stack 50, and is operated by the power supplied from the fuel cell stack 50. The load 60 may include one or more of various electrical devices such as a motor of a vehicle, an inverter that converts direct current electricity to alternating current electricity, or an electrical heating device.

The controller 70 is configured to electrically control the operation of the fuel supply unit 10, the humidifying unit 20, and the supply amount controller 40 to supply power required according to the load 60. The controller 70 accumulates the operation time of the fuel cell stack 50 to calculate the total operation time, and increases the stack activation period according to the total operation time. In detail, the stack activation period is a period in which the oxidizer supplied to the cathode of the plurality of unit cells forming the stack is blocked. The output power from the stack is not generated during the stack activation period. The stack activation period has the function of smoothing deterioration of the stack. That is, if the output power from the stack is generated for a long time without the stack activation period, deterioration of the stack increases.

In operation, the controller 70 increases the stack activation period as the total operation time of the fuel cell is increased, and the cycle of the stack activation period is decreased. That is, the time interval that the stack activation period is generated is decreased.

On the other hand, the fuel cell system 100 further includes a reformer 80 configured to generate a reformed gas by using fuel between the fuel supply unit 10 and the humidifying unit 20. In operation, the reformer 80 changes liquid fuel to hydrogen gas to generate electricity in the fuel cell stack 50 through a reforming reaction. The reformer 80 is also configured to decrease the concentration of carbon monoxide included in the hydrogen gas. In general, the reformer 80 includes a reforming unit 82 configured to generate the hydrogen gas by reforming the liquid fuel, and a carbon monoxide decreasing unit 84 configured to decrease concentration of the carbon monoxide in the hydrogen gas. The reforming unit 82 is configured to change the fuel to a reformed gas containing sufficient hydrogen through a catalytic reaction such as steam reforming, partial oxidation, or an exothermic reaction. In addition, the carbon monoxide decreasing unit 84 is configured to decrease concentration of the carbon monoxide contained in the reformed gas using a catalytic reaction such as a water-gas shift reaction or selective oxidation, or hydrogen purification using a membrane. In the present embodiment, the reformer 80 is formed separately to the humidifying unit 20. In some embodiments, however, the reformer 80 may include the humidifying unit 20.

Figure 2:
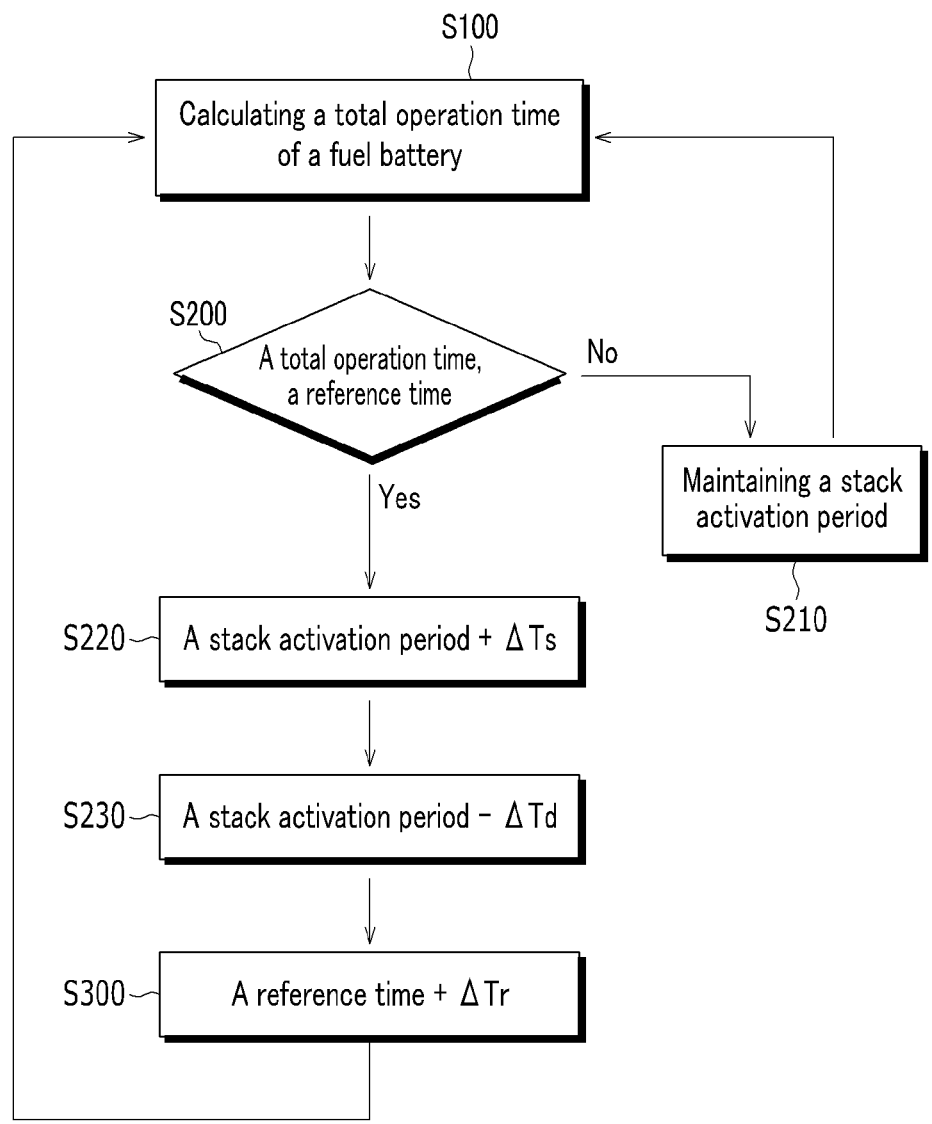
FIG. 2 is a flowchart depicting a driving method of a fuel cell system according to an exemplary embodiment of the present disclosure.

FIG. 2 is a flowchart depicting a method of driving a fuel cell system.

Figure 3:
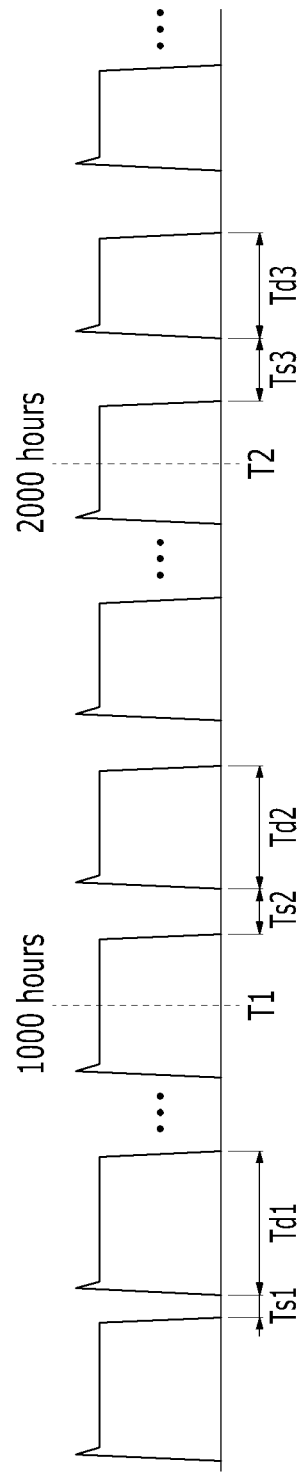
FIG. 3 is a view depicting a stack voltage and a stack activation period of a fuel cell system according to an exemplary embodiment of the present disclosure.

FIG. 3 illustrates a stack voltage and a stack activation period of a fuel cell system.

Referring to FIG. 2, the controller 70 is configured to monitor operation time of the fuel cell to calculate a total operation time (S100). The controller 70 is configured to determine whether the total operation time is more than a reference time (S200). The reference time is the reference to determine to increase the stack activation time. The stack activation cycle may be pre-determined according to design of the system.

In step S200, when the total operation time is less than the reference time, the stack activation period is maintained (S210).

In step S200, when the total operation time is more than the reference time, the stack activation period is increased by a predetermined unit period $\Delta Ts$ (S220). In some embodiments, the unit period $\Delta Ts$ is uniform. In some embodiments, the unit period $\Delta Ts$ may be increased related to increasing of the total operation time. More specifically, the unit period $\Delta Ts$ may be determined by calculating the output efficiency and the life-span of the fuel cell. In some embodiments, the unit period $\Delta Ts$ is uniformly maintained by monitoring the output efficiency of the fuel cell. In some embodiments, the unit period $\Delta Ts$ is increased in tandem with increasing of the total operation time by determining the life-span of the fuel cell.

In the step S200, when the total operation time is more than the reference time, the stack activation cycle is decreased by the predetermined unit cycle period $\Delta Td$ (S220). In some embodiments, the unit cycle period $\Delta Td$ may be uniform. In some embodiments, the unit cycle period $\Delta Td$ may vary. In some embodiments, the unit cycle period $\Delta Td$ may be increased according to the total operation time. More specifically, the unit cycle period $\Delta Td$ may be determined by calculating the output efficiency and the life-span of the fuel cell. In some embodiments, the unit cycle period $\Delta Td$ is uniformly maintained by calculating the output efficiency of the fuel cell. In some embodiments, the unit cycle period $\Delta Td$ is decreased in tandem with the increasing of the total operation time by determining the life-span of the fuel cell.

In the step S200, when the total operation time is more than the reference time, the reference time Tr is increased by the predetermined unit reference period $\Delta Tr$ (S230). In some embodiments, the unit reference period $\Delta Tr$ may be uniform. In some embodiments, the unit reference period $\Delta Tr$ may be changed. In some embodiments, the unit reference period $\Delta Tr$ may be decreased according to the total operation time. More specifically, the unit reference period $\Delta Tr$ may be determined by calculating the output efficiency and the life-span of the fuel cell. In some embodiments, the unit reference period $\Delta Tr$ is uniformly maintained by determining the output efficiency of the fuel cell. In some embodiments, the unit reference period $\Delta Tr$ may be decreased in tandem with the increasing of the total operation time by determining the life-span of the fuel cell.

In the present disclosure, the unit period $\Delta Ts$, the unit cycle period $\Delta Td$, and the unit reference period $\Delta Tr$ may be determined as values that are changed according to the total operation time. In some embodiments, however, the unit period $\Delta Ts$, the unit cycle period $\Delta Td$, and the unit reference period $\Delta Tr$ may be determined as uniform values that do not change according to the total operation time. For example, FIG. 3 shows the case that the unit period $\Delta Ts$, the unit cycle period $\Delta Td$, and the unit reference period $\Delta Tr$ are maintained as uniform values. In FIG. 3, the unit of the stack activation period is ms, and the unit of the stack activation period and reference period is hours. It will be understood by one of skill in the art, however, that the present disclosure is not limited thereto. As shown in FIG. 3, the reference period is increased as a unit of 1000 hours according to the increasing of the total operation time (for example, the unit reference period $\Delta Tr$ is 1000 hours), the stack activation cycle is decreased as a unit of one hour according to the increasing of the total operation time (for example, the unit cycle period $\Delta Td$ is one hour), and the stack activation period is increased as a unit of 2 ms according to the increasing of the total operation time (for example, the unit period $\Delta Ts$ is 2 ms).

In operation, the stack activation period Ts1 is 2 ms, and the stack activation cycle Td1 is 10 hours before the total operation time becomes the reference period 1000 hours.

If the total operation time reaches the reference period of 1000 hours at the time T1, the stack activation period Ts2 is 4 ms after the time T1, and the stack activation cycle Td2 is 9 hours. Also, the reference period is increased to 2000 hours.

If the total operation time reaches the reference period of 2000 hours at the time T2, the stack activation period Ts3 is 6 ms, and the stack activation cycle Td3 is 8 hours.

As described above, the stack activation period is increased in tandem with the increasing of the total operation time. Further, if the stack activation cycle is decreased, the stack is activated more often according to the increasing of the total operation time. This method of driving the fuel cell system may thus prevent deterioration of the stack.

While this invention has been described in connection with what are presently considered to be practical certain exemplary embodiments, it will be appreciated by those skilled in the art that various modifications and changes may be made without departing from the scope of the present disclosure. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A fuel cell system, comprising:
a fuel cell stack having a plurality of unit cells;
a fuel supply unit configured to supply fuel to the fuel cell stack;
an oxidizer supply unit configured to supply oxidizer to the fuel cell stack; and
a controller electrically connected to both the fuel supply unit, the fuel cell stack, and the oxidizer supply unit, wherein the controller is configured to control operation of the fuel supply unit and the oxidizer supply unit, calculate a total operation time of the fuel cell stack operated by the fuel and oxidizer, and vary a stack activation period blocking the oxidizer to the fuel cell stack and a stack activation cycle of which the stack activation period is generated according to the total operation time.

2. The fuel cell system of claim 1, wherein the controller is configured to increase the stack activation period, decrease the stack activation cycle, and increase the reference time if the total operation time reaches a predetermined reference time.

3. The fuel cell system of claim 2, wherein the controller is configured to increase the stack activation period by the predetermined unit period each time the total operation time reaches a reference time.

4. The fuel cell system of claim 3, wherein the unit period is uniform.

5. The fuel cell system of claim 3, wherein the unit period is increased according to the total operation time.

6. The fuel cell system of claim 2, wherein the controller is configured to decrease the stack activation cycle by a predetermined unit cycle period each time the total operation time reaches the reference time.

7. The fuel cell system of claim 6, wherein the unit cycle period is uniform.

8. The fuel cell system of claim 6, wherein the unit cycle period is increased according to the total operation time.

9. The fuel cell system of claim 2, wherein the controller increases the reference time by the unit reference period to generate a reference time every time the total operation time reaches the reference time.

10. The fuel cell system of claim 9, wherein the unit reference period is uniform.

11. The fuel cell system of claim 9, wherein the unit reference period is decreased according to the total operation time.

12. A method of driving a fuel cell system, comprising:
supplying a fuel from a fuel supply unit to a fuel cell system having a fuel cell stack, wherein the fuel cell stack comprises a plurality of unit cells;
supplying an oxidizer from an oxidizer supply unit to the fuel cell stack;
controlling the supplying of the fuel and the supplying of the oxidizer to operate the fuel cell stack via a controller, wherein the controller is electrically connected to the fuel supply unit, the oxidizer supply unit, and the fuel cell stack;
calculating a total operation time of the fuel cell system; and
varying a fuel cell stack activation period in which the oxidizer is blocked to the fuel cell stack using the total operation time and a fuel cell stack activation cycle and a fuel cell stack activation period.

13. The method of claim 12, wherein the varying of the fuel cell stack activation period comprises increasing the fuel cell stack activation period, decreasing the fuel cell stack activation cycle, and increasing a reference time if the total operation time reaches the reference time.

14. The method of claim 13, wherein the varying a fuel cell stack activation period comprises increasing the fuel cell stack activation period by a predetermined unit period when the total operation time reaches the reference time.

15. The method of claim 13, wherein the fuel cell stack activation cycle is decreased by a predetermined unit cycle period when the total operation time reaches the reference time.

16. The method of claim 13, wherein the reference time is increased by the unit reference period to generate a reference time when the total operation time reaches the reference time.

* * * * *